US009529349B2

(12) United States Patent
Marti et al.

(10) Patent No.: US 9,529,349 B2
(45) Date of Patent: Dec. 27, 2016

(54) SUPERVISOR USER MANAGEMENT SYSTEM

(71) Applicant: Honeywell International Inc., Morristown, NJ (US)

(72) Inventors: Jerry Marti, West Salem, OH (US); Sadiq Basha, Bangalore (IN); Ajay N. Nair, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 888 days.

(21) Appl. No.: 13/657,620

(22) Filed: Oct. 22, 2012

(65) Prior Publication Data

US 2014/0114440 A1 Apr. 24, 2014

(51) Int. Cl.
G05B 15/02 (2006.01)
G05B 19/02 (2006.01)
G05B 19/042 (2006.01)

(52) U.S. Cl.
CPC ........... *G05B 19/02* (2013.01); *G05B 19/0425* (2013.01); *G05B 15/02* (2013.01); *G05B 2219/2222* (2013.01); *G05B 2219/24167* (2013.01)

(58) Field of Classification Search
CPC ............................. G05B 19/02; G05B 19/0425
USPC ............... 700/9; 707/695, 704; 711/147–153
See application file for complete search history.

(56) References Cited

U.S. PATENT DOCUMENTS 4,375,637 A 3/1983 Desjardins
4,816,208 A 3/1989 Woods et al.
5,042,265 A 8/1991 Baldwin et al.
5,161,387 A 11/1992 Metcalfe et al.
5,385,297 A 1/1995 Rein et al.
(Continued)

FOREIGN PATENT DOCUMENTS

WO WO 01/97146 12/2001
WO WO 02/052432 7/2002
(Continued)

OTHER PUBLICATIONS

Bersoff et al., "Impacts of Life Cycle Models on Software," Communications of the ACM, vol. 34, No. 8, pp. 104-118, Aug. 1991.

(Continued)

*Primary Examiner* — Mohammad Ali
*Assistant Examiner* — Sheela S Rao
(74) *Attorney, Agent, or Firm* — Seager, Tufte & Wickhem, LLP

(57) ABSTRACT

An approach for control of users relative to access to controllers of a site in a hierarchy of controllers and building equipment. When a user of a customer has established a read write connection to a site controller, the customer does not necessarily want any subsequent user to establish a read write connection to the site controller or another controller within the same site and also make changes, for example, to settings of building equipment. Thus, a subsequent user may be allowed a read only connection and just be able to view building equipment information. When the first user has disconnected either intentionally or by inactivity, the site controller may be cleared allowing a subsequent user to obtain a read write connection. If the first user is inactive but fails to disconnect from the controller, an auto log-off provision may disconnect the user after a specified period of inactivity.

19 Claims, 14 Drawing Sheets

(56) References Cited

U.S. PATENT DOCUMENTS

| | | |
|---|---|---|
| 5,390,206 A | 2/1995 | Rein et al. |
| 5,544,036 A | 8/1996 | Brown, Jr. et al. |
| 5,768,119 A | 6/1998 | Havekost et al. |
| 5,929,761 A | 7/1999 | Van der Laan et al. |
| 5,946,303 A | 8/1999 | Watson et al. |
| 5,955,946 A | 9/1999 | Beheshti et al. |
| 6,031,343 A | 2/2000 | Recknagel et al. |
| 6,124,790 A | 9/2000 | Golov et al. |
| 6,141,595 A | 10/2000 | Gloudeman et al. |
| 6,178,362 B1 | 1/2001 | Woolard et al. |
| 6,185,483 B1 | 2/2001 | Drees |
| 6,195,309 B1 | 2/2001 | Ematrudo |
| 6,223,544 B1 | 5/2001 | Seem |
| 6,295,526 B1 | 9/2001 | Kreiner et al. |
| 6,295,527 B1 | 9/2001 | McCormack et al. |
| 6,301,624 B1 | 10/2001 | Lee et al. |
| 6,314,328 B1 | 11/2001 | Powell |
| 6,351,213 B1 | 2/2002 | Hirsch |
| 6,356,282 B2 | 3/2002 | Roytman et al. |
| 6,389,464 B1 | 5/2002 | Krishnamurthy et al. |
| 6,420,968 B1 | 7/2002 | Hirsch |
| 6,430,712 B2 | 8/2002 | Lewis |
| 6,466,654 B1 | 10/2002 | Cooper et al. |
| 6,473,407 B1 | 10/2002 | Ditmer et al. |
| 6,492,901 B1 | 12/2002 | Ridolfo |
| 6,535,122 B1 | 3/2003 | Bristol |
| 6,549,135 B2 | 4/2003 | Singh et al. |
| 6,643,355 B1 | 11/2003 | Tsumpes |
| 6,643,516 B1 | 11/2003 | Stewart |
| 6,675,591 B2 | 1/2004 | Singh et al. |
| 6,681,156 B1 | 1/2004 | Weiss |
| 6,690,980 B2 | 2/2004 | Powell |
| 6,761,470 B2 | 7/2004 | Sid |
| 6,813,587 B2 | 11/2004 | McIntyre et al. |
| 6,816,811 B2 | 11/2004 | Seem |
| 6,832,120 B1 | 12/2004 | Frank et al. |
| 6,870,141 B2 | 3/2005 | Damrath et al. |
| 6,879,253 B1 | 4/2005 | Thuillard |
| 6,892,546 B2 | 5/2005 | Singh et al. |
| 6,919,809 B2 | 7/2005 | Blunn et al. |
| 6,947,972 B2 | 9/2005 | Chun |
| 6,955,302 B2 | 10/2005 | Erdman, Jr. |
| 6,966,060 B1 | 11/2005 | Young et al. |
| 6,973,627 B1 | 12/2005 | Appling |
| 6,990,821 B2 | 1/2006 | Singh et al. |
| 7,009,510 B1 | 3/2006 | Douglass et al. |
| 7,024,283 B2 | 4/2006 | Bicknell |
| 7,026,925 B2 | 4/2006 | Roche et al. |
| 7,031,880 B1 | 4/2006 | Seem et al. |
| 7,062,389 B2 | 6/2006 | Johnson et al. |
| 7,068,931 B2 | 6/2006 | Tokunaga |
| 7,069,181 B2 | 6/2006 | Jerg et al. |
| 7,085,674 B2 | 8/2006 | Iwasawa |
| 7,107,268 B1 | 9/2006 | Zawadzki et al. |
| 7,113,085 B2 | 9/2006 | Havekost |
| 7,133,141 B1 | 11/2006 | Abi-Salch |
| 7,171,287 B2 | 1/2007 | Weiss |
| 7,183,907 B2 | 2/2007 | Simon et al. |
| 7,206,646 B2 | 4/2007 | Nilson et al. |
| 7,243,044 B2 | 7/2007 | McCalla |
| 7,250,856 B2 | 7/2007 | Havekost et al. |
| 7,272,452 B2 | 9/2007 | Coogan et al. |
| 7,277,018 B2 | 10/2007 | Reyes et al. |
| 7,320,023 B2 | 1/2008 | Chintalapati et al. |
| 7,345,580 B2 | 3/2008 | Akamatsu et al. |
| 7,379,997 B2 | 5/2008 | Ehlers et al. |
| 7,386,586 B1 | 6/2008 | Headley et al. |
| 7,428,726 B2 | 9/2008 | Cowan et al. |
| 7,457,869 B2 | 11/2008 | Kernan |
| 7,460,020 B2 | 12/2008 | Reyes et al. |
| 7,490,319 B2 | 2/2009 | Blackwell et al. |
| 7,496,911 B2 | 2/2009 | Rowley et al. |
| 7,565,225 B2 | 7/2009 | Dushane et al. |
| 7,596,613 B2 | 9/2009 | Silverthorne et al. |
| 7,644,371 B2 | 1/2010 | Robertson et al. |
| 7,653,459 B2 | 1/2010 | Pouchak et al. |
| 7,703,073 B2 | 4/2010 | Illowsky et al. |
| 7,734,572 B2 | 6/2010 | Wiemeyer et al. |
| 7,774,457 B1 | 8/2010 | Talwar et al. |
| 7,782,302 B2 | 8/2010 | Lee et al. |
| 7,819,334 B2 | 10/2010 | Pouchak et al. |
| 7,826,929 B2 | 11/2010 | Wacker |
| 7,870,090 B2 | 1/2011 | McCoy et al. |
| 7,873,719 B2 | 1/2011 | Bishop et al. |
| 7,886,031 B1 | 2/2011 | Taylor et al. |
| 7,890,927 B2 | 2/2011 | Eldridge et al. |
| 7,900,228 B2 | 3/2011 | Stark et al. |
| 7,904,186 B2 | 3/2011 | Mairs et al. |
| 7,941,786 B2 | 5/2011 | Scott et al. |
| 8,060,602 B2 | 11/2011 | Singh et al. |
| 8,078,481 B2 | 12/2011 | Steinbarth et al. |
| 8,090,477 B1 | 1/2012 | Steinberg |
| 8,112,162 B2 | 2/2012 | Pouchak et al. |
| 8,146,060 B2 | 3/2012 | Lekel |
| 8,190,273 B1 | 5/2012 | Federspiel et al. |
| 8,218,570 B2 | 7/2012 | Moran et al. |
| 8,224,466 B2 | 7/2012 | Wacker |
| 8,224,763 B2 | 7/2012 | Guralnik et al. |
| 8,224,888 B2 | 7/2012 | Brindle |
| 8,225,292 B2 | 7/2012 | Naslavsky et al. |
| 8,239,500 B2 | 8/2012 | Pouchak |
| 8,335,593 B2 | 12/2012 | Johnson et al. |
| 8,341,599 B1 | 12/2012 | Angalet et al. |
| 8,347,291 B2 | 1/2013 | Marwinski |
| 8,352,047 B2 | 1/2013 | Walter |
| 8,527,291 B1 * | 9/2013 | Kochendorfer .................. 705/2 |
| 8,527,947 B2 | 9/2013 | Clemm |
| 8,572,502 B2 | 10/2013 | Dharwada et al. |
| 8,572,616 B2 | 10/2013 | Cai et al. |
| 8,600,556 B2 | 12/2013 | Nesler et al. |
| 8,819,562 B2 | 8/2014 | Nair et al. |
| 2002/0002425 A1 | 1/2002 | Dossey et al. |
| 2002/0073076 A1 | 6/2002 | Xu et al. |
| 2002/0122073 A1 | 9/2002 | Abrams et al. |
| 2002/0152298 A1 | 10/2002 | Kikta et al. |
| 2003/0078677 A1 | 4/2003 | Hull et al. |
| 2003/0101009 A1 | 5/2003 | Seem |
| 2003/0171851 A1 | 9/2003 | Brickfield et al. |
| 2003/0225472 A1 * | 12/2003 | Kato ............... H05K 13/08 700/117 |
| 2004/0027004 A1 | 2/2004 | Bayoumi et al. |
| 2004/0143510 A1 | 7/2004 | Haeberle et al. |
| 2004/0230328 A1 | 11/2004 | Armstrong et al. |
| 2005/0038571 A1 | 2/2005 | Brickfield et al. |
| 2005/0043862 A1 | 2/2005 | Brickfield et al. |
| 2005/0143863 A1 | 6/2005 | Ruane et al. |
| 2005/0172258 A1 * | 8/2005 | Nixon ............... G05B 23/0216 717/100 |
| 2005/0193285 A1 | 9/2005 | Jeon |
| 2005/0203490 A1 | 9/2005 | Simonson |
| 2005/0222889 A1 | 10/2005 | Lai et al. |
| 2006/0020962 A1 | 1/2006 | Stark et al. |
| 2006/0038672 A1 | 2/2006 | Schoettle |
| 2006/0058923 A1 | 3/2006 | Kruk et al. |
| 2006/0064305 A1 | 3/2006 | Alonso |
| 2006/0069886 A1 | 3/2006 | Sandoval |
| 2006/0077726 A1 | 4/2006 | Simmitsu |
| 2006/0095835 A1 | 5/2006 | Kennedy et al. |
| 2006/0136558 A1 | 6/2006 | Sheehan et al. |
| 2006/0136677 A1 * | 6/2006 | Fuhs ............... G06F 12/0831 711/147 |
| 2006/0168013 A1 | 7/2006 | Wilson et al. |
| 2006/0253205 A1 | 11/2006 | Gardiner |
| 2007/0198674 A1 | 8/2007 | Li et al. |
| 2008/0010049 A1 | 1/2008 | Pouchak et al. |
| 2008/0189162 A1 | 8/2008 | Ganong et al. |
| 2009/0055914 A1 | 2/2009 | Azami |
| 2009/0106684 A1 | 4/2009 | Chakra et al. |
| 2009/0113037 A1 | 4/2009 | Pouchak |
| 2009/0287526 A1 | 11/2009 | Ramkumar et al. |
| 2009/0327294 A1 * | 12/2009 | Bailor ............... G06F 17/24 |
| 2010/0106453 A1 | 4/2010 | Marti |
| 2010/0131653 A1 | 5/2010 | Dharwada et al. |
| 2010/0131877 A1 | 5/2010 | Dharwada et al. |

(56) References Cited

U.S. PATENT DOCUMENTS

| | | | |
|---|---|---|---|
| 2010/0198651 A1 | 8/2010 | Johnson et al. | |
| 2010/0251184 A1 | 9/2010 | Majewski et al. | |
| 2010/0286937 A1 | 11/2010 | Hedley et al. | |
| 2011/0010654 A1 | 1/2011 | Raymond et al. | |
| 2011/0083077 A1 | 4/2011 | Nair et al. | |
| 2011/0087731 A1 | 4/2011 | Wong et al. | |
| 2011/0093493 A1 | 4/2011 | Nair et al. | |
| 2011/0098863 A1 | 4/2011 | Miki | |
| 2011/0113360 A1 | 5/2011 | Johnson et al. | |
| 2011/0196539 A1 | 8/2011 | Nair et al. | |
| 2011/0225580 A1 | 9/2011 | Nair et al. | |
| 2011/0298608 A1 | 12/2011 | Ranjan et al. | |
| 2011/0316688 A1 | 12/2011 | Ranjan et al. | |
| 2012/0005731 A1 | 1/2012 | Lei et al. | |
| 2012/0084660 A1 | 4/2012 | Nair et al. | |
| 2012/0084696 A1 | 4/2012 | Marti | |
| 2012/0166992 A1 | 6/2012 | Huynh et al. | |
| 2013/0131869 A1* | 5/2013 | Majewski et al. | 700/275 |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

U.S. Appl. No. 14/059,286, filed Oct. 21, 2013.
U.S. Appl. No. 14/327,451, filed Jul. 9, 2014.
http://domin.dom.edu/documents/emaildocs/outlook/, "Outlook Web Access 2003," 19 pages, printed Nov. 7, 2013.
Kalavade et al., "A Hardware-Software Codesign Methodology for DSP Applications," IEEE Design and Test of Computers, pp. 16-28, 1993.
Magnusson et 41., "Simics: A Full Simulation Platform," IEEE, pp. 50-58, 2002.
McCown et al., "APSIM: A Novel Software System for Model Development, Model Testing and Simulation in Agricultural Systems Research," Agricultural Systems, vol. 50, pp. 255-271, 1996.
Niagara, "Niagara AX-3.x User Guide," Tridium Inc., 436 pages, 2007.
Pressman, "Software Engineering Notes—Compiled from Software Engineering A Practitioner's Approach," Fifth Edition, 67 pages, 2009.
Simunic et al, "Cycle-Accurate Simulation of Energy Consumption in Embedded Systems," ACM, pp. 867-872, 1999.
Trane, "Tracer MP580/581 Programmable Controllers," CNT-PRC002-EN, Mar. 2003.
Vykon by Tridium, "Niagara Browser Access Guide," 125 pages, revised Aug. 15, 2002.
Vykon by Tridium, "Niagara Networking & Connectivity Guide," Niagara Release 2.3, 245 pages, 2002.
Adobe Acrobat 6.0 Standard, Version 6.0.2, Screenshots, 2 pages, May 18, 2004.
U.S. Appl. No. 13/402,780, filed Feb. 22, 2012.
Honeywell Spyder Bacnet User's Guide, 242 pages, Revised Jul. 2009.
Honeywell Spyder User's Guide 202 pages, Released Jul. 2007.
Honeywell, "Excel Building Supervisor-Integrated R7044 and FS90 Ver. 2.0," Operator Manual, 70 pages, Apr. 1995.
Honeywell, "Excel 15B W7760B Building Manager," User's Guide, 84 pages, Revised Jan. 2005.
http://blogs.msdn.com/b/khen1234/archive/2005/05/11/416392.aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
http://www.google.com/maps, "Google Maps, Pin Location," 1 page, prior to Nov. 21, 2008.
Johnson Controls, "Fx Workbench, User's Guide," 818 pages, issued May 19, 2008.
Microsoft Word Screen Shots, 2 pages, prior to Nov. 21, 2008.
Novar, "Opus Supervisor User Guide," pp. 1-159, Feb. 1, 2012.
Novar, "Demand Response, Program Implementation and Execution," 8 pages, Oct. 28, 2008.
Novar, "Media Backgrounder," 10 pages, prior to Feb. 22, 2012.
Siemens, BACnet for DESIGO 27 Pages, prior to Dec. 30, 2009.
Trane, "System Programming, Tracer Summit Version 14, BMTW-SVP01D-EN," 623 pages, 2002.
Tridium, "NiagaraAX Product Model Overview," 7 pages, 2005.
Tridium, "Tridium & Niagara Framework Overview," 9 pages, prior to Oct. 28, 2008.
Atere-Roberts et al., "Implementation of a Computerized Maintenance Management System for the City of Atlanta," 13 pages, Proceedings of the Water Environment Federation, Jan. 1, 2002.
Business Objects, Crystal Reports Acess, Format, and Integrate Data, 4 pages, Dec. 2003.
Honeywell, "ComfortPoint Open BMS Release 100," Specification and Technical Data, 13 pages, Jun. 2012.
http://www.de2m.com/DE2R_Technical.html, "Data Enabled Enterprise Repository (DE2R) Technical Overview," 4 pages, printed Mar. 8, 2013.
Samsung, "Intelligent Building Management System, ControlCity-NX," 20 pages, May 31, 2012.
U.S. Appl. No. 14/862,715, filed Sep. 23, 2015.
U.S. Appl. No. 14/862,858, filed Sep. 23, 2015.

* cited by examiner

| Workbench Service Manager | | | 6 objects |
|---|---|---|---|
| Service | Installed | Auto Start | Running |
| OpusEnterprise:OpusSyncClientService | true | false | true |
| OpusSupervisor:OpusAutoLogOffClientService | true | false | true |
| alarm:AlarmPortalTool | true | false | false |
| bacnet:BacnetWbService | true | false | false |
| lonworks:LonWbService | true | false | false |
| workbench:WbJobService | true | false | false |

| OpusAutoLogOffService (Opus Auto Log Off Service) | | |
|---|---|---|
| ☐ Auto Log Off Enable | false ▸ | |
| ☐ Notification Period | 00000h 05m ⊠ | [0ms - 1day] |
| ☐ Force Disconnect Period | 00000h 02m ⊠ | [0ms - 1day] |

SUPERVISOR USER MANAGEMENT SYSTEM

BACKGROUND

The present disclosure pertains to controllers and particularly to hierarchies of controllers and components. Particularly, the disclosure pertains to users and the respective controllers.

SUMMARY

The disclosure reveals control of users relative to access to controllers of a site in a hierarchy of controllers and components. When a first or primary user's client application has established a read write connection to a site controller, a customer does not necessarily want any subsequent or secondary users allowed a read write connection to the site controller within a site of other controllers and also make changes. The secondary users may obtain a read only connection and therefore will only be able to view site controller information and not be allowed to make changes. When the primary user has disconnected either intentionally or by inactivity, the site controller may be cleared thereby allowing the next user connection to be given full read/write permission. User behavior may be extended to all controllers within the same site. This means that if the primary user connects to a first site controller, then virtually all of the other site controllers within the site may have knowledge of this event, so as to ensure that a secondary user connection to any of the controllers of the site is given read only access at any controller of the site. Another aspect to the present approach may ensure that the primary user cannot prevent secondary user access if the first user fails to disconnect from the site. If the primary user connects to a site controller and leaves for the day, the connection may remain, thus blocking secondary users from achieving full access. However there may be an auto log-off provision where, after a specified time period of inactivity, the primary user can be disconnected.

BRIEF DESCRIPTION OF THE DRAWING

FIG. 3 is a diagram showing a sync client service and an auto log off client service installed as client side companion services;

FIGS. 11 and 12 are diagrams pertaining to an auto log off;

DESCRIPTION

A customer using the Novar™ Opus™ supervisor may manage and communicate with hundreds or thousands of remote site controllers from a centralized location via the users' intranet. Each of the site controllers may be referred to as an XCM (executive control module) or an XCM controller. The XCM or site controller in turn may manage and communicate with tens or hundreds of field controllers within the site that perform real time control of building equipment such as HVAC units, lighting panels, refrigeration circuits, and so forth.

Figure 1:
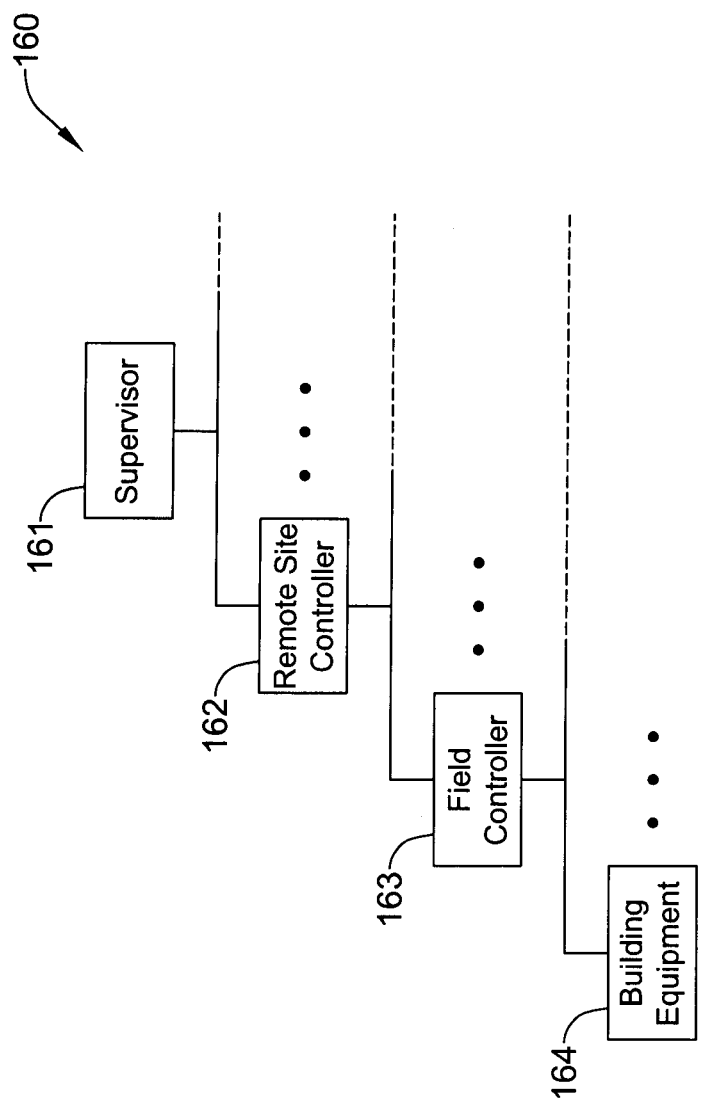
FIG. 1 is a diagram of an example hierarchy of an Opus™ system.

FIG. 1 is a diagram of an example hierarchy 160 of the supervisor 161. Numerous site controllers 162 may be managed by supervisor 161. Numerous field controllers may be managed by a site controller 162. Numerous components of building equipment 164 may be managed by a field controller.

The present system and approach, as described herein and/or shown in the Figures, may incorporate one or more processors, computers, controllers, user interfaces, wireless and/or wire connections, and/or the like, wherever desired or needed.

The previous Opus system may be configured to allow for multiple, simultaneous user access logins. The customer may have a scenario where there may be multiple users responding to alarms or alert events that have been reported from the same site of XCM controllers. When a user elects to "work" an alarm, the user may use the Opus Architect™ to navigate the supervisor to establish a connection with a site XCM controller. Alternately, the user may be using a web browser to do the same. Once connected, the user may observe runtime statuses and make setpoint adjustments to diagnose the alarm condition. An issue is that more than one user may be simultaneously connected to the same XCM or an XCM within the same site and make changes affecting each other. Also, the customer operational process may be for the user to initiate a field technician to visit the site to resolve a physical issue. If two users are working two different issues from the same site, they may potentially initiate two field technician visits incurring double the maintenance cost. The probability of multi-user conflicts or incurring the extra maintenance costs appears higher as the customer may have 20 to 30 simultaneous users working alarms from over 5000 sites.

When the first user's client application has established a connection to the XCM, the customer does not necessarily want any secondary users to be allowed to connect to an XCM within the same site and make changes. The secondary users may connect but will only be able to view the XCM information and will not necessarily be allowed to change settings. When the secondary user connects, the user may be informed that another primary (first) user (by name) is connected and the second user may be assigned read only privileges. When the first user has disconnected either manually or by inactivity, the XCM will clear allowing the next user connection to be given full read/write permission. If a secondary user has been given read only permission, the user may need to disconnect and reconnect to establish full permission. Additionally, the customer may ask to extend this behavior to all XCM controllers within the same site. This means that if the first user connects to XCM #1, then virtually all of the other XCMs within this site may have knowledge of this event, so as to ensure that a second user connection to any XCM is given read only access.

Also, a secondary aspect to the present approach may ensure that the first primary user cannot prevent secondary user access if the first user fails to disconnect from the site. The previous Opus implementation does not necessarily time out user client sessions. If the first user connects to an XCM and leaves for the day, the connection may be maintained blocking other secondary users from full access. The present approach may include an auto log-off provision where, after a specified time period, the user client session may be disconnected.

A feature summary may encompass the following items. 1) A feature may incorporate single user write access across all XCMs within a single site. When a write-enabled user connects to an XCM, the user may have sole write access to this XCM and the other XCM's within the same site. 2) The feature may apply to users configured with write permission. Users without write permission may virtually always be given their configured permissions. 3) When the first write-enabled user connects to a site XCM, the user may be assigned its configured permissions. 4) When a secondary write-enable user connects to a site XCM, the user may be assigned read only permissions. 5) When a secondary write-enabled user connects to a site XCM, the user may be informed that the user has been given read only permission because another primary user (by name) is already connected to a site XCM. 6) A user client auto log-off after a specified time out may ensure that a site is not left blocked by an inactive primary user.

Issues may incorporate allowing un-restricted multi-user access regardless of user permission levels, and a user leaving a client connected to an XCM indefinitely.

A new single user access login service feature may be developed using two new service components. (Incidentally, labels like OpusSingleUserService may be broken up with spaces in the present description.) First, an Opus Single User Service may be added into the XCM Services and may operate within the Opus XCMs. Second, an Opus Single User Client Service may operate within the Opus Architect client application. The Opus Single User Service may be available in the Opus Enterprise™ module. The Opus Single User Client Service may be installed automatically in the Opus Architect client application and may be verified in the client "Workbench Service Manager" option in the Tools menu. In addition, the user may need to ensure that virtually all site XCMs have their respective Niagara™ networks configured to allow communication with all of the other site XCM's. This may be to ensure that the single user sign-on service operates for all of the XCM's within a site.

When configured, the services may allow only the first write enabled user's client application to establish a connection and have full access to an XCM within the site. This same user may also have the same access to all other XCMs within the same site. The service may prevent secondary write capable users from being connected to any XCM within the site. When the secondary write user connects, the user may be informed that another user (by name) is connected and the user may continue in its connection with read only privileges. In order for this automated reduction of user access privileges to occur, in one scenario, the built-in "guest" user may have to be enabled and configured for read only. This guest user may be used by the service to allow the secondary user to proceed with read only access. If the quest user is disabled or not configured, the service may inform the secondary user that there is already a primary user connected and that the secondary user needs to re-login as a read-only user. The secondary user session may then be disconnected and access is prevented. This element may go about performing the duties necessary to fulfill its responsibilities. This approach may encompass a description of any algorithms used, changes of state, relevant time or space complexity, concurrency, methods of creation, initialization and cleanup, and a handling of exceptional conditions.

The auto log-off should be configured within the Opus Auto Log Service added to the Opus Supervisor. The user may enable the auto log-off and set a notification time period and a force disconnect time period. The notification time period may be the amount of inactivity time that expires from the last time the user accessed an XCM. When this notification time expires, the client application may inform the user that the XCM session is about to be disconnected. The user may have the option to manually reset this time period allowing continued access. If the user does not respond to the notification dialog, the force-disconnect time period may be observed and when it expires the XCM session may be forcibly disconnected. This may ensure a user that leaves for the day does not necessarily lock out other users.

The Opus Single User Service may perform the server side user login synchronization. It may accomplish this by tracking the login attempts and sharing the active user information between the peer XCMs within the same site. This service may also determine when a secondary user connection occurs, and establish a block on the connection.

When an Opus Architect user connects to the XCM, the Opus Single User Client Service may read the user login status maintained in the Opus Single User Service. If the user is found to be "blocked", the Opus Single User Client Service may proceed to reject the login attempt.

Figure 2:
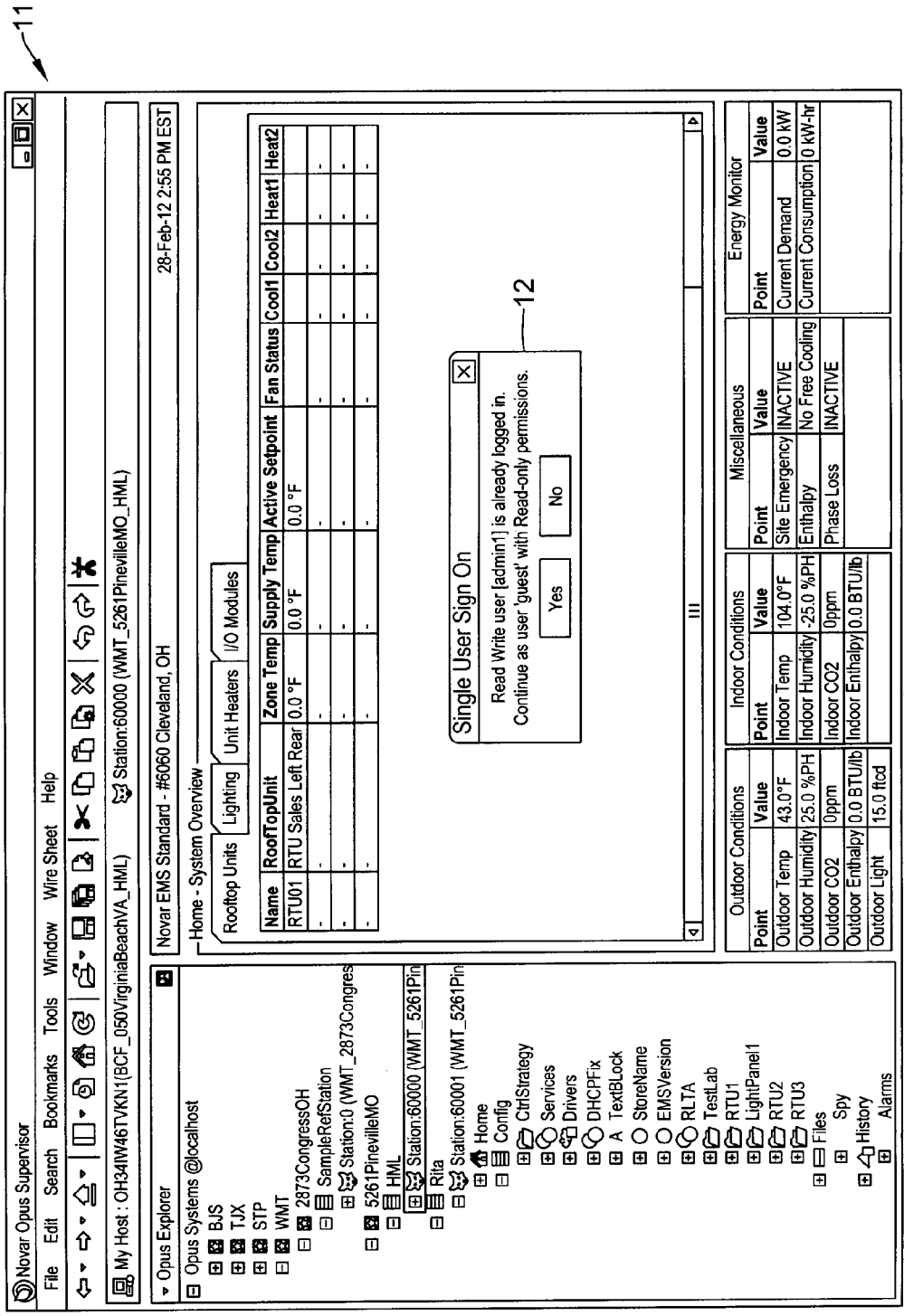
In FIG. 2 is a diagram of a client view 11 showing a dialog presented to a secondary user as a user attempts connecting to a site controller where another primary user is already connected.

In FIG. 2, a diagram of the Opus Architect client view 11 shows a dialog 12 presented to the secondary user as the user attempts connecting to an XCM where another primary user is already connected.

FIG. 3 is a diagram of an image 13 showing the Opus Sync Client Service and the Opus Auto Log Off Client Service installed as client side companion services, with indications of installation, auto start and running status.

The following use cases may be used to accomplish the single user access.

Figure 4:
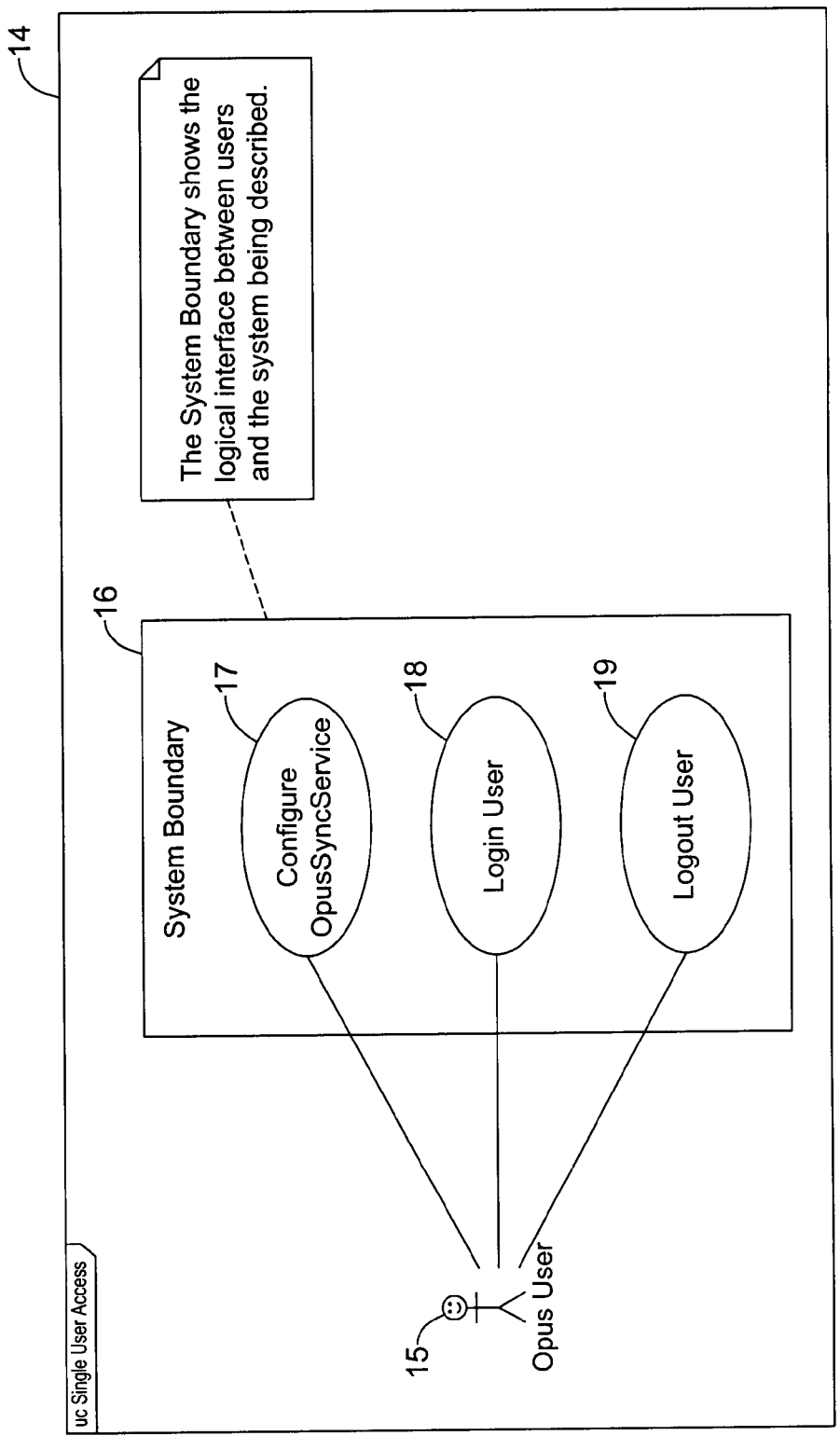
FIG. 4 is a diagram of a single user access.

FIG. 4 is a diagram 14 of a single user access. An Opus user 15 may have a logical interface, as indicated by a system boundary 16, between user 15 and a system. The items interfaced by user 15 may incorporate a configure Opus sync service 17, a login user 18 and a logout user 19. A feature may allow the single user write access across all XCMs within a single site. When a write-enabled user connects to an XCM, the user may have sole write access to this XCM and other XCMs within the same site. This feature should not allow the secondary write-enable user to connect to a site XCM and the user may be informed to re-login as a read only permission user, or if guest user is enabled and configured for read only, the feature will connect the secondary user as guest. The feature may allow virtually all of the secondary read only users. The feature may work both on thick clients and thin clients.

The present design may accomplish the requirement is handled by two sides of processing, one being the client side processing and other on server side processing. Specifically, the service makes use of a timer on client side and fox sessions on server side.

Figure 5:
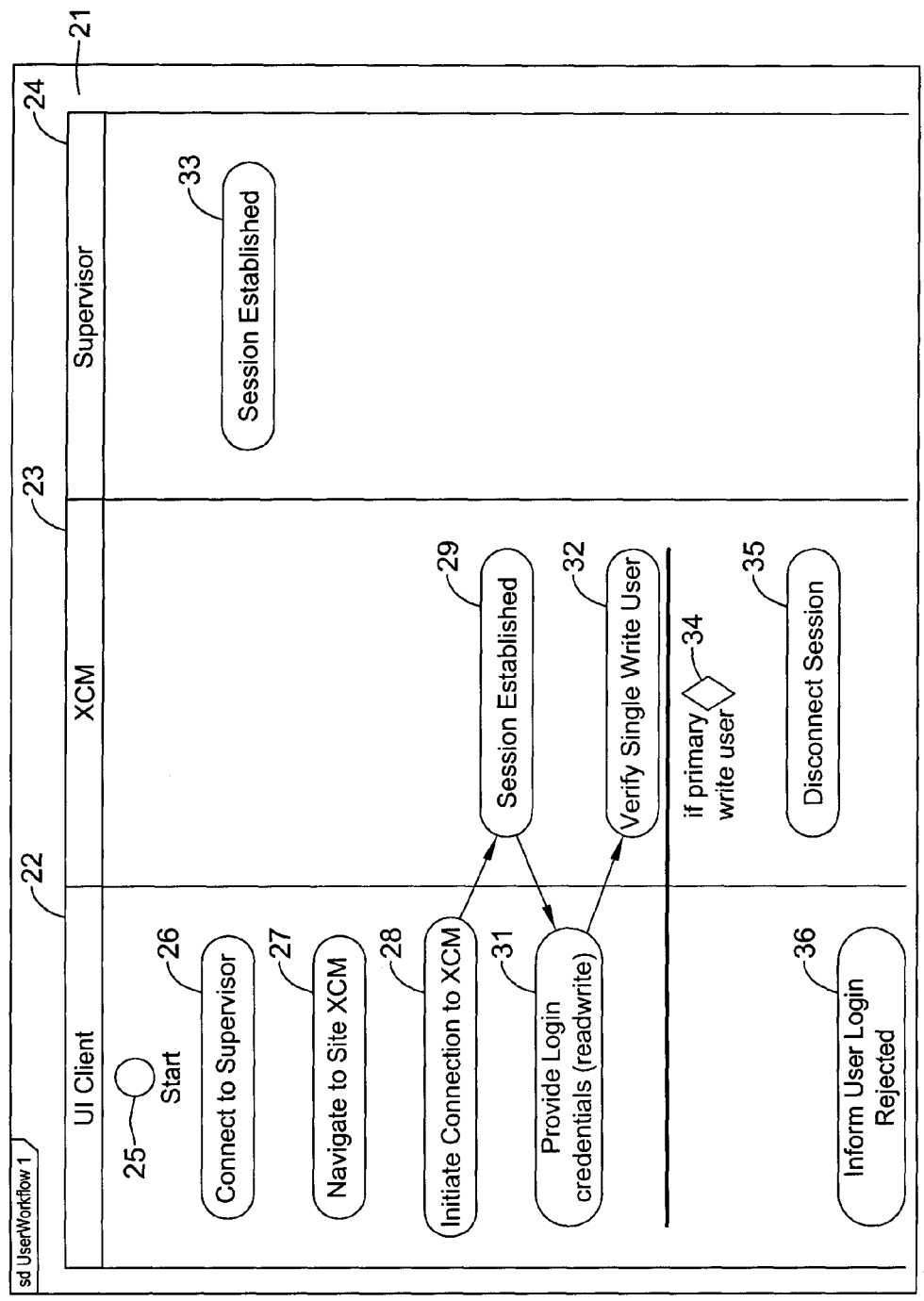
FIG. 5 is a diagram relating to client/server workflow overview.

FIG. 5 is a diagram 21 relating to client/server interaction processing. The client side processing may execute independent of a server side's interaction and may be achieved through workbench service Opus Single User Client Service. This service may use Opus Client Session Monitor to monitor the active fox sessions to block any secondary read write user who ever attempts to login. The timer may run every 2 seconds to check any blocked users on the connected sessions. If a blocked user is found, the service may display a message to the user depending on guest user configuration. If the guest user is enabled and configured for read only access, the current read write session may be disconnected and guest user may be logged in, and if guest is disabled or configured for read write access, the secondary read write session may be informed about the other primary write user and may be simply disconnected.

As for thin client support, Opus XCM Web Profile may have to be set in virtually all XCMs for all the users to have single user access to work on a web applet. An Opus XCM Web Profile has View( ) approach may be overridden to process the above described logic on a client web applet.

Diagram 21 may pertain to a user work flow interaction having a UI client 22, an XCM 23, and a supervisor 24, respectively. A start 25 in UI client portion 22 may lead to a connect to supervisor at symbol 26, with a session established with supervisor 24 at symbol 33, navigate to site XCM at symbol 27, and initiate a connection to the XCM at symbol 28. Symbol 28 may lead to a session established indicated by symbol 29 at XCM 23. The established session may lead to providing login credentials (read/write) at symbol 31 at UI client 22. Upon providing login credentials, a single write user may be verified at XCM 23 of symbol 32. If the user is a primary write user at symbol 34 of XCM 23, then the session may be disconnected at XCM 23 of symbol 35. The user may be informed of a login rejection at a UI client as indicated in symbol 36.

Figure 6:
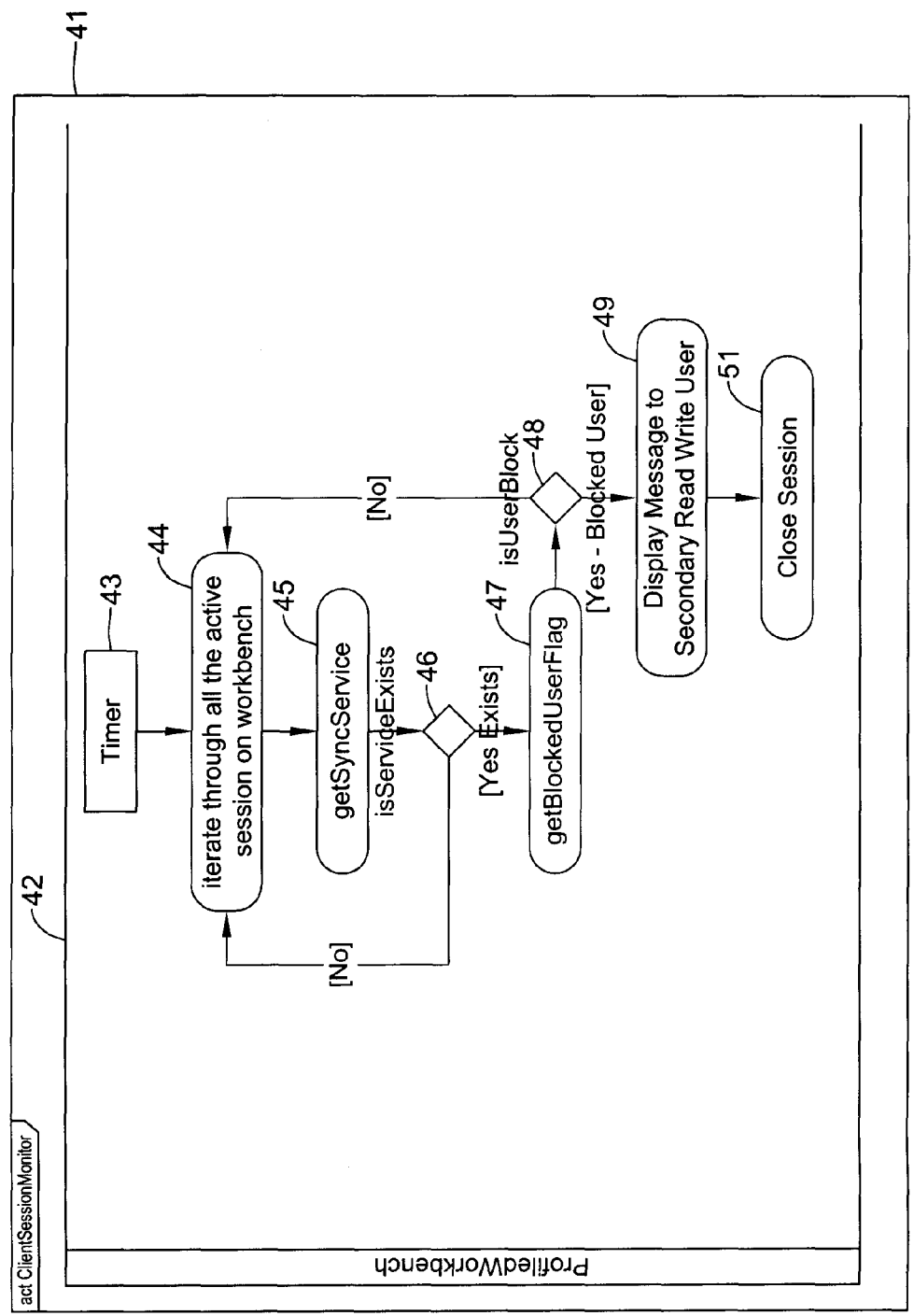
FIG. 6 is a diagram that may relate to client side processing.

FIG. 6 is a diagram 41 that may relate to client to server session processing. At the server side, the whole processing of identifying the primary read write user and secondary read write user may occur. Once the Opus Single User Service is added to the station, the fox session listeners may be registered, fox session listeners may include the listener who listens to the sessions being connected or disconnected to the station where the service is added. The present logic may differentiate the different connected sessions like workbench, applet, and so forth, from other stations. The service may act only on the session connected from workbench and applet view.

As soon as the workbench or applet connection is made to the station, i.e., any user logged in to the station, a fox listener call back approach may be invoked and the service may identify the user and its permission levels.

A primary user may be decided, if there are no Opus remote user details under its Opus Single User Service and the other station's Opus Single User Service.

If the current user logged in is the first read write user in the site, the user may become a primary user and be granted full access permissions, and the Opus remote user details like username, permissions, login time and ip address may be synced (added under Opus single user service) across the stations under the site. Once the information is synced, a heart beat timer may be started to send the primary user access details every 5 minutes to handle the fail over scenarios like a lost connection between stations.

If another user with read write permissions tries to login into the site, the service may identify the user as a secondary read write user and block the user by setting a flag on the Opus single user service. The blocked user flag may be monitored by the client service (refer to client side processing), and depending on the guest user configuration, the user may be shown a message to re login or login as guest user.

If the logged user is a read only user, there may be no processing done for this user, and the user may be allowed to login without any processing.

Once the primary user is logged out from the station, there may be a call back on the fox listener, and then the service may remove the Opus remote user details locally and from the other stations. The heart beat timer may be cancelled as the primary user is logged out.

Diagram 41 shows a client session monitor as indicated on a profiled workbench 42. A timer 43 may have an output that causes an interaction through all of the active sessions at symbol 44 on workbench 42. An output from symbol 44 may go to get server side sync service information at symbol 45. A question of whether the service exists may be asked at symbol 46. If not, no actions may be taken and then a return may be made to symbol 44 where another iteration through the active session may occur, and again the question of sync service existence is asked at symbol 46. If the service exists, then a blocked user flag may be sought at symbol 47. A question of whether the flag state indicating blocked can be obtained may be asked at symbol 48. If not, then a return may be made to symbol 44 where another iteration through the active session occurs, and again the question of sync service may be asked at symbol 46. If the service exists, then a blocked user flag may be sought at symbol 47. The question of whether the flag state indicating blocked can be obtained may be asked at symbol 48. If the flag indicating user blocked is obtained, then a message of a blocked user may be provided to symbol 49 where the message is displayed to a secondary read write user. At this place, the session may be closed at symbol 51.

In the following may be various sections of Opus single user service. Diagrams of FIGS. 7 and 8 may be noted. Opus Single User Service may be configured in view of FIG. 7. Steps may incorporate: 1) Open Opus Enterprise module in a Palette; 2) Drag and Drop Opus Single User Service from palette to XCM station under services; 3) Allow only one Opus sync service to be in station; 4) Opus sync service will register the fox listeners as explained above; 5) Reset or clean the Opus sync service (Opus remote user details); and 6) Sync with other XCM stations (add the remote user details under the local Opus Single User Service).

Figure 7:
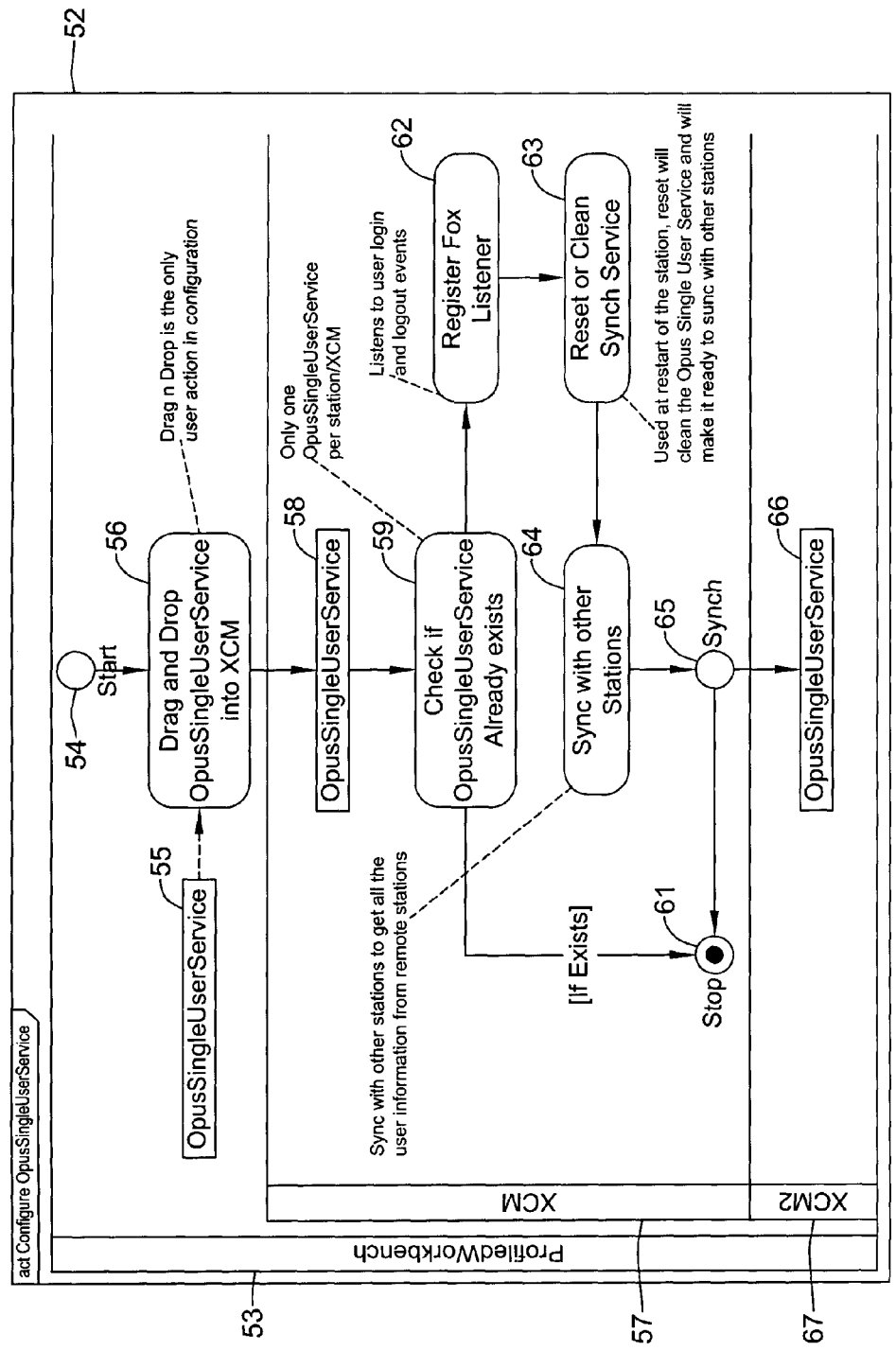
FIGS. 7 and 8 are diagrams of the single user service.

FIG. 7 is a flow diagram 52 for a configure Opus single user service. From a start place 54 in a profiled workbench 53, an Opus single user service from a symbol 55 may be dragged and dropped according to symbol 56 into an XCM 57 at symbol 58. The drag and drop may be an only user action in the configuration of diagram 52. Going from symbol 58 to symbol 59, a check of whether an Opus single user service already exists may be made. There may be only one Opus single user service per station/XCM. If the service exists, then the process may stop at symbol 61. If not, then a fox listener may be registered at symbol 62. The listener may listen to user login and logout events. Then at symbol 63, the sync service may be reset or cleaned. This step may be used at restart of the station, and the reset may clean the Opus single user service and make it ready to sync with other stations. The sync with other stations may occur at symbols 64 and 65 to get all user information from remote stations. The process may stop at symbol 61 or the Opus single user service as indicated at symbol 66 in XCM2 67 may sync at symbol 65 to update user information.

Figure 8:
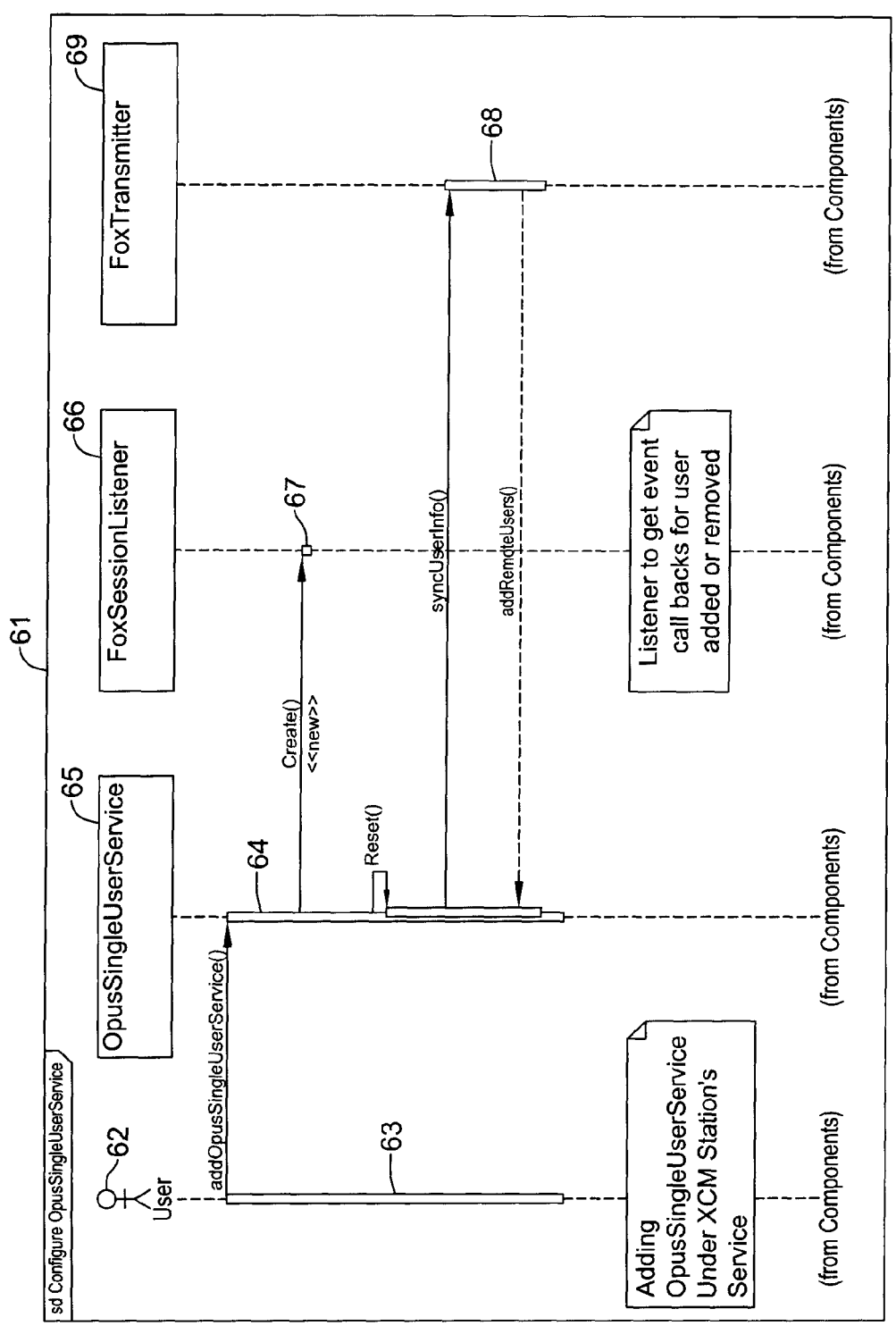

FIG. 8 is a diagram 61 of the configure Opus single user service. An Opus user 62 may be at stage 63 where an Opus single user service is added at stage 64 as indicated at symbol 65. The Opus single user service may be added under an XCM station's service. A fox session listener at symbol 66 may be created new at stage 67. The listener may get event call backs for a user added or removed. The Opus single user service may be reset at stage 64. Sync of user information may be provided from stage 64 to a stage 68 at a fox transmitter as indicated in symbol 69.

Figure 9:
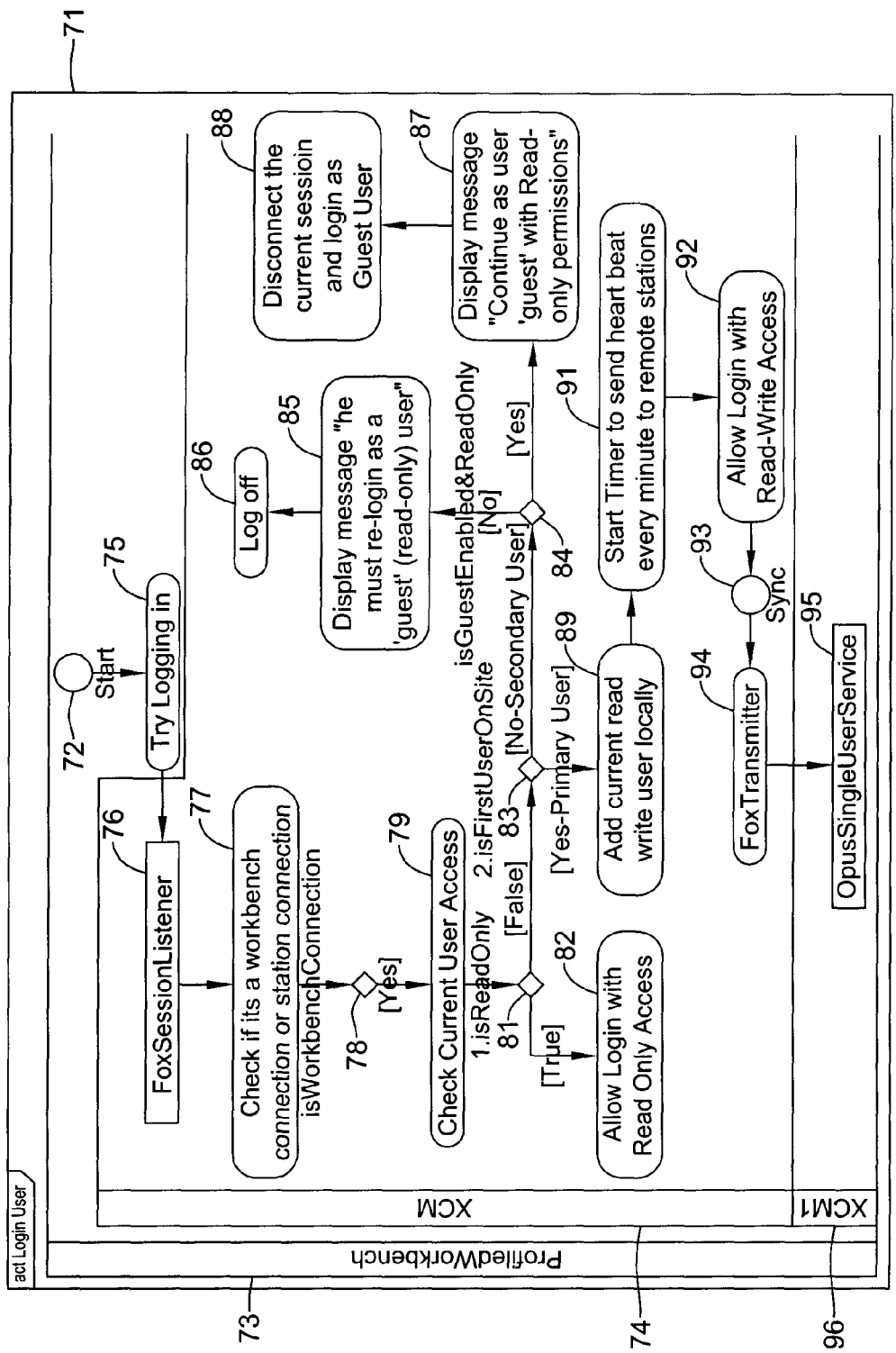
FIG. 9 is a diagram pertaining to a user login to an XCM.

FIG. 9 is a diagram 71 that refers to the workflow of the login user activities. Steps for the login user may incorporate the following. 1) A user may try to log into the XCM under a particular site. 2) Flows to Opus Fox listener may be controlled. The Opus Fox listener may do so below. 3) There may be differentiation of workbench sessions with station sessions. 4) Current user permissions may be checked. 5) If the current user finds read only, the login may be allowed. 6) If the current user is a read write user, then the primary user may be checked as explained in the server side processing, i.e., the user is the first user on site. 7) If the current user is a first write user, then allow login and start a timer running every one minute to send heart beats to remote stations; and if the current user is a secondary read write user, set a flag and disconnect.

Diagram 71 may reveal activity of a login of a user. From a start point 72 in a profiled workbench 73, a user may try logging into an XCM 74 as indicated at symbol 75. If a login is successful, the user may get a fox session listener at symbol 76 in XCM 74. Then at symbol 77, a check may be made to see if a connection is that of a workbench or a station. A question of whether it is a workbench connection at symbol 78 may be asked. If yes, then current user access is checked at symbol 79. After the check at symbol 79, whether the user is a read only may be determined to be true or false at symbol 81. "Read only" users may be users with all category masks marked with "Operator Read" and "Admin Read." If it is true that the user is a read only, then login may be allowed with read only access at symbol 82. If false, then a question of whether the user is the first user on site may be asked at symbol 83. A check may be made to note whether there is any read write user locally and any on remote stations. It does not connect to remote stations for user information. Instead, it may check the entries made by remote stations under the local Opus single user service as part of a sync mechanism.

If the user is not the first user on site at symbol 83, then the user may be a secondary user. At symbol 84, a question may be asked of whether the guest user account is enabled and read only. If not, then a message may be displayed which states, "user must re-login as a 'guest' (read-only) user", as indicated at symbol 85. Thus, the user may log off at symbol 86.

If an answer to the question at symbol 84 of whether the guest user account is enabled and read only guest is yes, then a message "continues as user 'guest' with Read-only permissions" at symbol 87. At symbol 88, the current session and login as a guest user may be disconnected.

If an answer to the question about the user being a first user on site is yes, the user may be a primary user. The user may be added as a current read write user locally at symbol 89. The addition here may be used when remote stations want to sync up the data, i.e., a remote station may copy the user information from the XCM 74 to be in sync. It may happen at a restart of the stations.

A timer may be started to send a heart beat every minute to remote stations, at symbol 91. At symbol 92, the user may be allowed login with read write access. Sync may occur at symbol 93 with a signal to a fox transmitter at symbol 94. The sync may happen only to the remote stations which will match the local site information. Only read write user information may be synced across the stations. From the fox transmitter at symbol 94, a signal may go to an Opus single user service at symbol 95 in XCM1 96.

Figure 10:
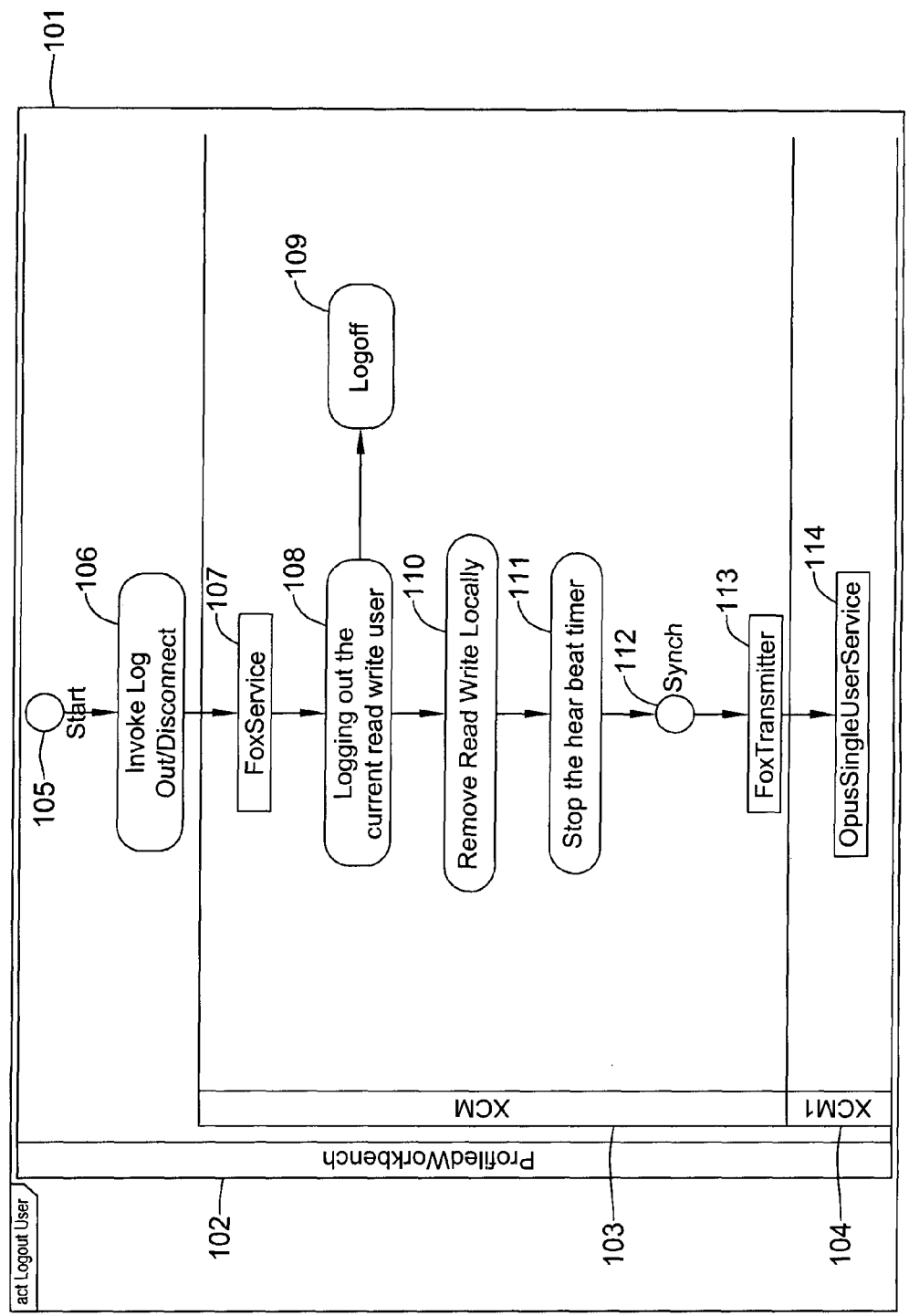
FIG. 10 is a diagram pertaining to a user logout.

FIG. 10 is a diagram 101 that may refer to a user logout. The logout may be as in the following. 1) The user may be logging out. 2) Flows to the fox listener may be controlled. The fox listener does as indicated below. 3) The current read write user may be removed locally. 4) The heart beat timer which sends a heart beat every minute to other remote stations may be cancelled. User information may be synced, i.e., the current read write user entries on the remote stations may be removed.

In diagram 101, a start point 105 in profiled workbench 102 may invoke a logout and/or disconnect at symbol 106. Fox service may be triggered at symbol 107 in XCM 103. The current read write user may be logged out at symbol 108 and logged off at symbol 109. The read write may be removed locally at symbol 110 and the heart beat timer may be stopped at symbol 111. A synch may occur at symbol 112 and be passed on to a fox transmitter at symbol 113. Then there may be an Opus single user service at symbol 114 in XCM1 104 that sync's the removal of the user.

Figure 12:
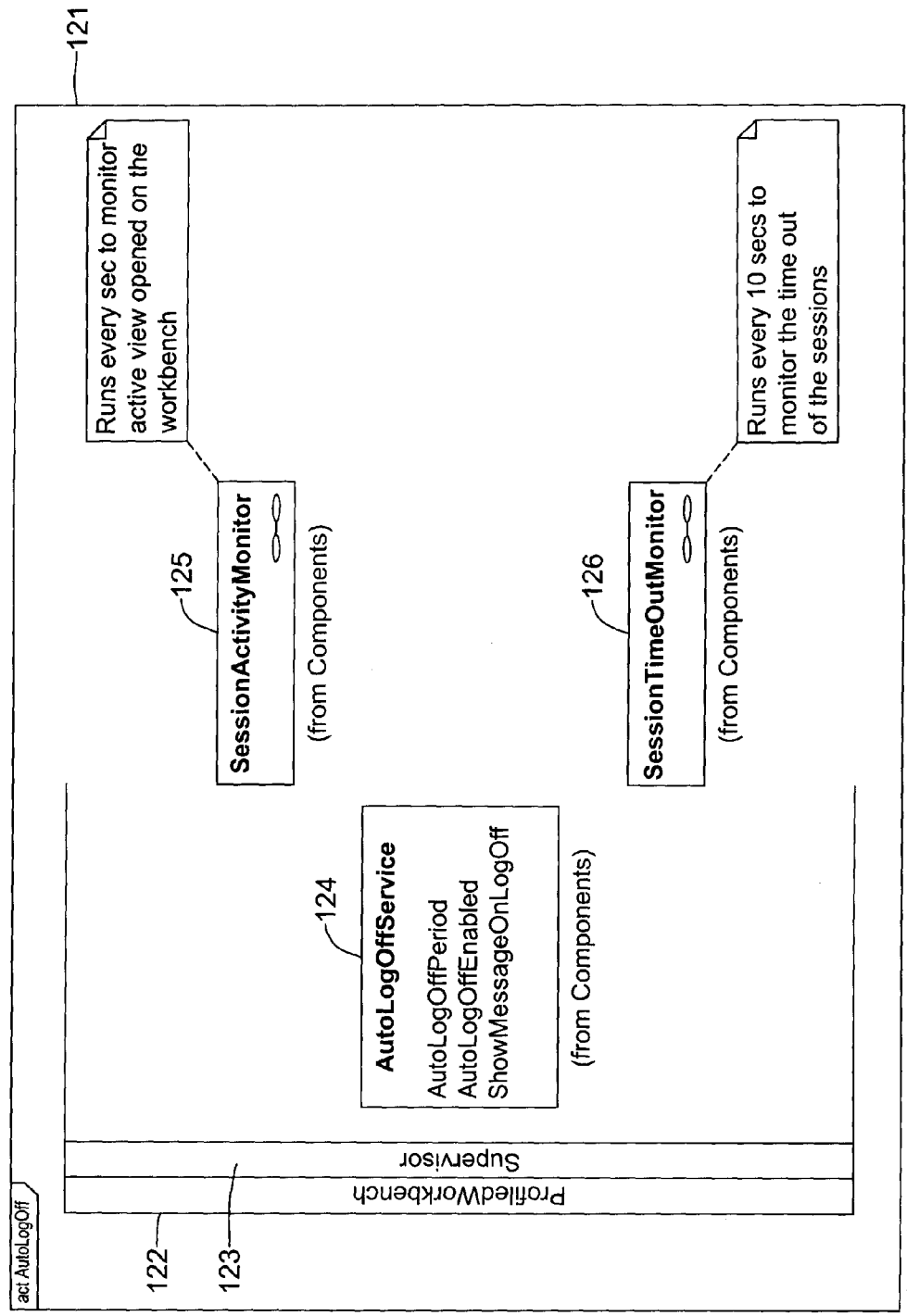

FIGS. 11 and 12 are diagrams 115 and 121, respectively, relating to an auto log off. The Opus supervisor may allow for one or more users to connect the Opus Architect to the supervisor to navigate to and connect to the remote site XCM controllers. In this process, the Opus Architect users may have established connections to the supervisor station and then additional connections to each site XCM controller that they navigate. The Opus Architect may maintain all of the TCP/IP connections until one of the following actions occurs: 1) The user closes the Opus Architect; or 2) The user manually disconnects the Opus Architect from the site XCM's and supervisor.

If the user leaves the application open and continually navigates to different site XCM controllers without manually disconnecting, the connections to all the sites visited may be maintained building up a large set of connection resources. A need may be to ensure that these connections are discontinued after a period of inactivity. The user may establish a time period in minutes which specifies the maximum allowable period of inactivity. The Opus system may setup a monitor of these connections and when the notification (inactivity) time expires, the system may either automatically disconnect the TCP/IP connections, or optionally inform the user in an alert window that one or more connections are about to be closed giving the user an opportunity to override. If there is no user response after the force disconnect period, then the connections may be closed. The notification timer should be defaulted to 30 minutes. Also, the notification timer should be run independently for each connection. The user option for the alert window might be in the user service.

The Opus supervisor may allow for one or more users to connect the Opus Architect to the supervisor to navigate to and connect to the remote site XCM controllers. In this process, the Opus Architect users may have established connections to the supervisor station and then additional connections to each site XCM controller that they navigate. The Opus Architect may maintain all the TCP/IP connections until one of the following actions occurs: 1) The user closes the Opus Architect; or 2) The user manually disconnects the Opus Architect from the site XCM's and supervisor.

Diagram 115 may be of a screen print showing the user configurable properties for the Opus Auto Log-off service. The items incorporated in the screen print may be an auto log off enable, a notification period and a force disconnect period.

If the user leaves the application open and continually navigates to different site XCM controllers without manually disconnecting, the connections to all the sites visited may be maintained, building up a large set of connection resources. The present approach may ensure that the connections are discontinued after a period of inactivity. The supervisor user may establish an auto logoff period in minutes which specifies the maximum allowable period of inactivity.

The Opus system may setup a monitor of these connections, and when the inactivity time expires, the system may either automatically disconnect the TCP/IP connections or optionally inform the user in an alert window that one or more connections are about to be closed, giving the user an opportunity to override one or more closures of the connections.

Diagram 121 in essence is of an auto log off feature. The feature may allow the supervisor user to configure the auto log off period, allow the supervisor user to enable and disable the auto log off service, allow the inactive connections to be discontinued after a period of inactivity, and display to the user with all sessions about to expire, with an exception of the supervisor and active sessions, to be disconnected or reset.

The approach to accomplish the requirement may be handled by the client side processing and be a pre-configured Opus Auto Log Off service at the supervisor. As to client processing, the client service Opus Auto Log Off Client Service may have two timers to accomplish the task, one being the session activity monitor and other the session time-out monitor. The timers may run irrespective of service enabled or disabled. The timers, i.e., the Session Timeout Monitor and Session Activity Monitor, may be started when the profiled work bench is started and stopped, or when the profiled work bench is closed.

Diagram 121 may reveal an auto log off service in a symbol 124 of supervisor 123 which in turn is linked to a profiled workbench 122. As part of auto log off service in symbol 124, there may be an auto log off period, an auto log off enabled and a show message on log off. Along with auto log off service of supervisor 123, there may be a session activity monitor of symbol 125 and a session time out monitor of symbol 126 as a part of the profiled workbench at symbol 122. The session activity monitor may run, for example, every second to monitor an active view opened on the workbench. The session time out monitor may run, for example, every 10 seconds, to monitor the time outs of the sessions between the profiled workbench at symbol 122 and the supervisor at symbol 123.

Figure 13:
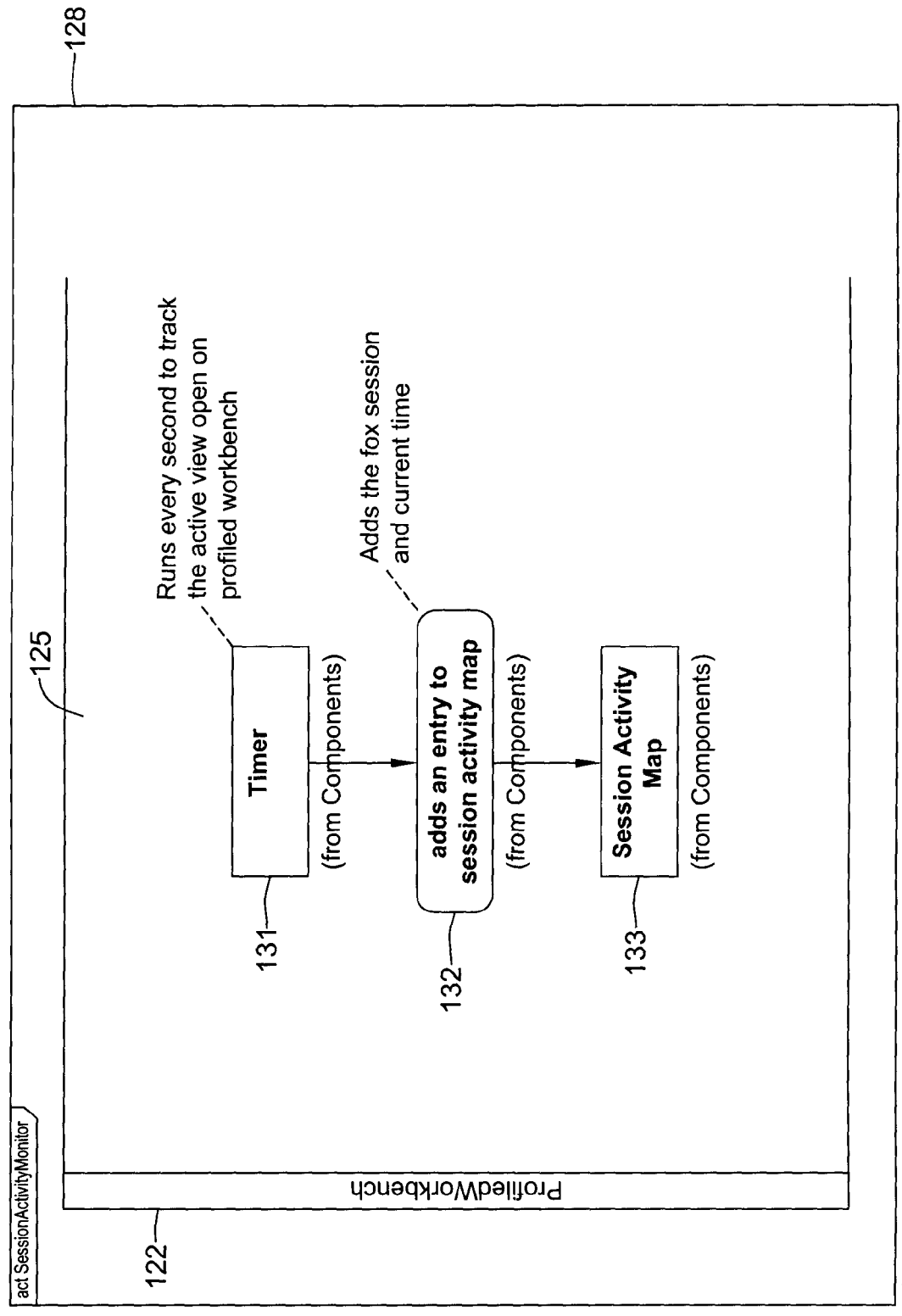
FIG. 13 is a diagram pertaining to a session activity monitor.

FIG. 13 is a diagram 128 relating to a Session Activity Monitor. The Session Activity Monitor may run every second to capture user actions. The Session Activity timer may store the active view, i.e., a fox session, which is active at that second and the current time which is stored into activity map.

Diagram 128 may reveal the session activity monitor of symbol 125 in a profiled workbench 122. There may be a timer at symbol 131 with an output to a symbol 132 where an entry to a sessions activity map may be added. An output of symbol 132, which may have the entry indicated there, may go along with the session and current time to symbol 133 which represents the session activity map. The timer at symbol 131 may run every second to track the active view open on the profile workbench 122. The activity represented by symbol 132 may include specifically the fox session and the current time.

Figure 14:
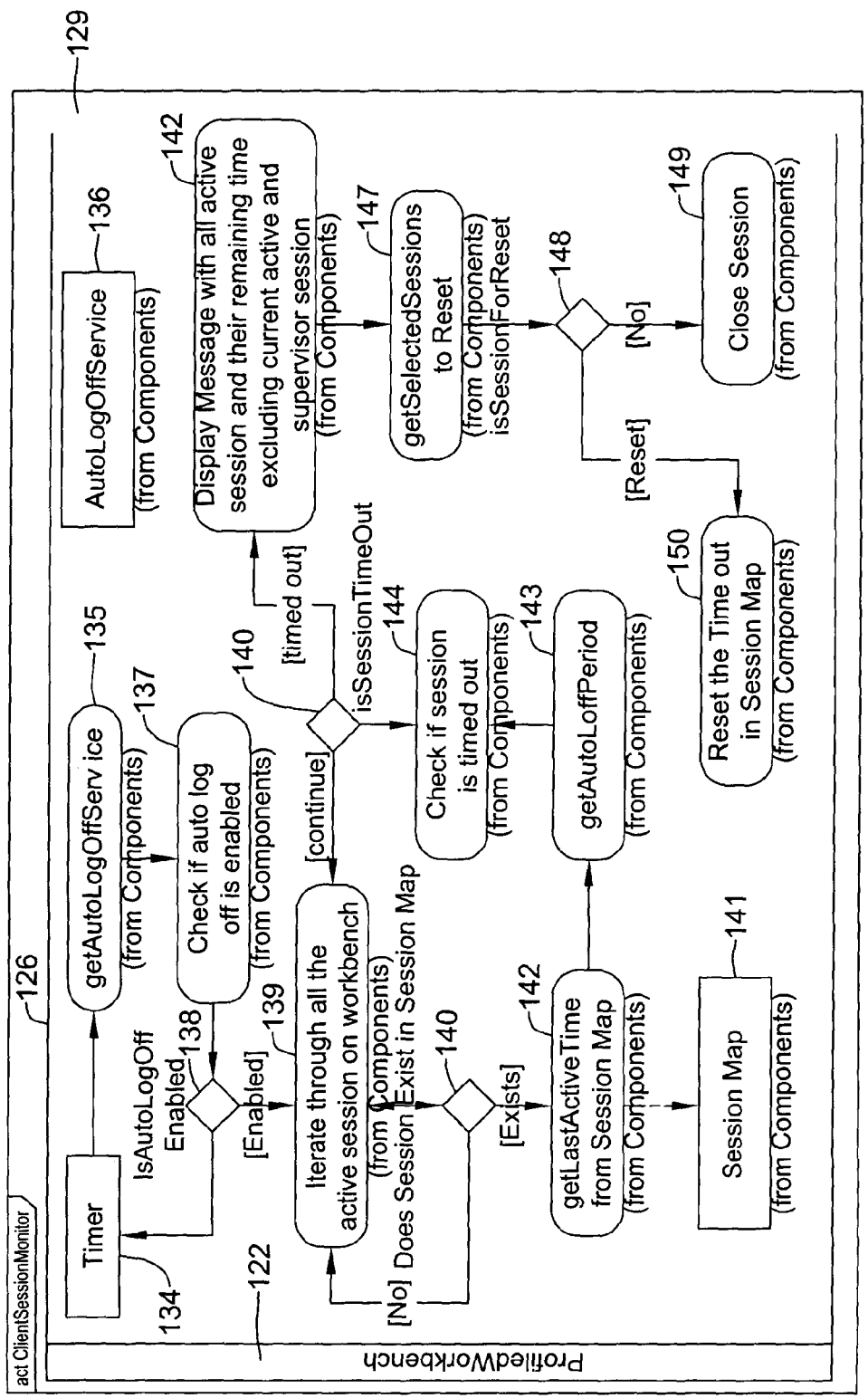
FIG. 14 is a diagram pertaining to a session time out monitor.

FIG. 14 is a diagram 129 that may relate to the Session Time Out Monitor. The monitor may run every, for example, 10 seconds to time out the expired sessions. The timer may start picking up the Opus Auto Log Off Service from the Supervisor session, and if the auto log off is enabled, then it may start the process for auto log off.

Virtually all of the sessions on the client may be processed on a one by one basis to check if the session is expired or still active. Expiry of the session may have arrived if the current time is after the last active time plus the auto log off period. The time period may be adjustable and be served by the supervisor. If any one of the sessions is found to be expired, then all of the other sessions, except the supervisor and current active sessions, may be displayed to the user along with the time left to expire.

The user may have an option to reset the session timers or to disconnect the sessions. Once the user selects the station to reset, then the session for the station may be set to active, and the unselected stations may be disconnected.

There may be a server side interface. An Opus Auto Log Off Service may be a pre configured service in a supervisor station. The properties for this service may be the following. There may be an Auto Log Off (Enable/Disable) that enables and disables the Opus auto log off feature—enabled. There may be a notification period (BRelTime) of a maximum allowable period of inactivity, e.g., 59 minutes. There may be a force disconnect period (BRelTime) of a maximum allowable period for the user to respond for the session dialog before forcing the XCM disconnect, e.g., 5 minutes.

Diagram 129 may reveal a session time out monitor 126 in profiled workbench 122. A timer 134 that, for example, runs every 10 seconds may have an output to symbol 135 where an auto log off service of symbol 136 is got from a supervisor session. At the next symbol 137, a check of whether the auto log off is enabled may be made. A question of whether the auto log off is enabled may be made at symbol 138. If not, then a return to timer 134 may be with a subsequent pass through items of symbols 135 and 137, and the question of enablement at symbol 138 may be asked again.

The process through the items of symbols 134, 135, 137 and 138, in that order, may be repeated until the question is answered as yes which means that the auto log off is enabled. If enabled, then there may be an iteration through all of the active sessions on workbench 122 at symbol 139. A question at symbol 140 is whether an active session exists in a session map of symbol 141. If not, then the activity at symbol 139 may be repeated. If yes, in that the active session exists, then at symbol 142 a last active time from the session map may be obtained. An auto log off period may be obtained at symbol 143. The session may be checked to note whether the session is timed out at symbol 144. The check may incorporate whether the current time is after the auto off period plus the last active time.

A question of whether the session is on a time out may be asked at symbol 145. If not, symbols 139, 140, 142-145 may be repeated until a response at symbol 145 indicates the session as timed out. If timed out, then a message may be displayed with all of the active sessions and their remaining times, excluding current active and supervisor sessions, as in symbol 146. Selected sessions may be got to reset as indicated by symbol 147. A question of whether the session is for reset may be asked at symbol 148. If an answer is no, then the session may be closed at symbol 149. If the answer is yes, then the time out in the session map may be reset, as indicated at symbol 150.

To recap, a control and resolution system for building equipment, may incorporate a supervisor, one or more of site controllers managed and/or communicated with by the supervisor, one or more field controllers managed and/or communicated with by a site controller, and building equipment controlled by a field controller. If a user is to review information of building equipment, the user may navigate the supervisor to establish a connection with a site controller cognizant of the building equipment. If the user is to make changes relative to the information of the building equipment, the user may obtain write permission for the connection with the site controller.

A user may be a primary user if the user has write permission for the connection to the site controller. Virtually any user having a connection to the site controller without write permission may be a secondary user.

Information of the building equipment may incorporate at least one or more alarms, statuses, setpoints, alert events and/or the like of the building equipment. Building equipment may incorporate HVAC units, lighting panels, refrigeration circuits, and related mechanisms.

If a user attempts to connect to a controller which already has a user with write permission connected to the controller, the user may be informed that the user only can connect to the controller with a read only permission.

When the primary user disconnects, the controller may clear the primary user thereby permitting another user to receive read and write permission. A maximum of one primary user may be permitted to be connected relative to virtually all site controllers within a site.

If a secondary user has read only permission, then the secondary user may receive write permission in the event that the primary user disconnects from the controller and the secondary user reconnects as a new primary user.

If the primary user does not disconnect from the controller but is inactive, an auto log-off provision may disconnect the primary user after a predetermined time period. Upon disconnection of the primary user, another user may connect to a controller within the site and have write permission.

Virtually all of the controllers within the site may communicate with one another. A connect service for a user may operate for virtually all of the controllers within the site. The connect service may permit the primary user to have write permission to virtually all the controllers in the site. The connect service may prevent a secondary user from having write permission to virtually any controller within the site. When a user attempts to obtain write permission when logging in to connect to a controller in the site, the connect service may inform the secondary user that there is a primary user connected and that the secondary user can login as a read-only user.

An auto log-off may be enabled relative to a primary user. A notification time period may be set as a predetermined amount of inactivity time that expires from a last time the primary user accessed the controller. When the notification time period expires before the primary user may again access the controller or another controller within the same site, a force disconnect time period may be set as a predetermined amount of inactivity time that occurs until the primary user is forcibly disconnected from the controller. The primary user may be informed when the notification time period expires that the connection by the primary user to the controller is about to be disconnected. The primary user may reset the force disconnect time period to allow continued access by the primary user to the controller.

A supervisor user management system may incorporate a supervisor, one or more site controllers of a site subject to management by and/or communication with the supervisor, one or more field controllers subject to management by and/or communication with a site controller of the one or more site controllers, and building equipment subject to observation and/or control by a field controller of the one or more field controllers.

A user may navigate the supervisor to connect to a site controller of the one or more site controllers to observe and/or control of building equipment. A first user of one or more users connected to a site controller of the one or more site controllers may have write permission relative to the site controller. If a second user is connected to the site controller of the one or more site controllers, the second user may have read only permission relative to the site controller. At least one controller may incorporate a processor.

A user with write permission may be a primary user. A user with read only permission may be a secondary user. The primary user may have write permission for virtually any site controller of the one or more site controllers of the site. The secondary user may have read only permission for virtually any site controller of the one or more site controllers of the site.

The system may further incorporate an auto log-off module connected to the supervisor. The auto log-off module may monitor activity of a primary user while connected to a site controller. If no activity of the primary user relative to the site controller is detected for a first predetermined period of time, the primary user may be notified about the inactivity. If no activity of the primary user relative to the site controller is detected for a second predetermined period of time after the first predetermined period of time, then the primary user may be disconnected from the site controller. The primary user may reset the second predetermined period of time in order to remain connected to the site controller.

The system may further incorporate a user logic synchronization module. The user synchronization module may track login attempts, share active user information among other controllers of the site, note a secondary user connection, establish a block on the connection, and/or reject a login attempt by the secondary user as a write user in view of a primary user presently being logged in.

An approach for managing user access to controllers for building control, may incorporate making a connection for a user to a site controller of one or more controllers of a site, classifying the user as a primary or secondary user according to a read only or write connection to the site controller, respectively, and limiting to one a number of primary users connected to the one or more controllers of the site. The primary user may view site controller information about building control and make changes to the information. The site controller information about building control may pertain to alarms, statuses, setpoints and/or event alerts and/or monitoring and actuation mechanisms of building control equipment.

The approach may further incorporate making a connection for one or more secondary users to the controller of the one or more controllers of the site. A secondary user may view site controller information but not make changes to the information.

The approach may further incorporate measuring a time of a connection without activity of the primary user to the site controller of the one or more site controllers, providing a notification to the primary user when the time of the connection without activity of the primary user to the site controller of the one or more site controllers reaches a first predetermined amount, measuring a time after the notification without activity of the primary user to the site controller of the one or more site controllers, and forcibly disconnecting the primary user when the time after the notification without activity of the primary user to the controller of the one or more site controllers reaches a second predetermined amount. The primary user may reset the time for measuring a time of a connection without activity of the primary user to the site controller of the one or more site controllers after the notification to avoid the forcibly disconnecting the primary user from the site controller.

Access details of a primary user may be synced across site controllers of a site. Upon the access details of the primary user being synced, a heart beat timer may be started to send access details at every certain number of units of time to handle fail over scenarios. The heart beat timer may be cancelled when the primary user is logged out.

The following applications may be related to the present application. U.S. patent application Ser. No. 12/260,046, filed Oct. 28, 2008, entitled "A Building Management Configuration System", is hereby incorporated by reference. U.S. patent application Ser. No. 12/643,865, filed Dec. 21, 2009, entitled "Approaches for Shifting a Schedule", is hereby incorporated by reference. U.S. patent application Ser. No. 12/703,476, filed Feb. 10, 2010, entitled "A Multi-Site Controller Batch Update System", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A control and resolution system for building equipment, comprising:
   a supervisor;
   one or more of site controllers managed and/or communicated with by the supervisor;
   one or more field controllers managed and/or communicated with by a site controller; and
   building equipment controlled by a field controller of the one or more field controllers; and
   wherein:
   if a user is to review information of building equipment, the user navigates the supervisor to establish a connection with a site controller cognizant of the building equipment;
   if the user is to make changes relative to the information of the building equipment, the user obtains write permission for the connection with the site controller;
   a user is a primary user if the user has write permission for the connection to the site controller;
   users having a connection to the site controller without write permission are secondary users; and
   if a user attempts to connect to a controller which has a primary user connected with write permission, the user is informed that the user only can connect to the controller as a secondary user having a read only permission.

2. The system of claim 1, wherein:
   the information of the building equipment comprises at least one or more alarms, statuses, setpoints, alert events and/or the like of the building equipment; and building equipment comprises HVAC units, lighting panels, refrigeration circuits, and related mechanisms.

3. The system of claim 1, wherein when the primary user disconnects, the controller will clear the primary user thereby permitting another user to receive read and write permission.

4. The system of claim 1, wherein a maximum of one primary user is permitted to be connected relative to all site controllers within a site.

5. The system of claim 1, wherein the secondary user can receive write permission in the event that the primary user disconnects from the controller and the secondary user reconnects as a new primary user.

6. The system of claim 1, wherein:
   if the primary user does not disconnect from the controller but is inactive, an auto log-off provision disconnects the primary user after a predetermined time period; and
   upon disconnection of the primary user, another user can connect to a controller within the site and have write permission.

7. The system of claim 1, wherein:
   the controllers within the site can communicate with one another; and
   a connect service for a user operates for the controllers within the site.

8. The system of claim 7, wherein:
   the connect service permits the primary user to have write permission to all of the controllers in the site; and
   the connect service prevents a secondary user from having write permission to any controller within the site.

9. The system of claim 8, wherein when a user attempts to obtain write permission when logging in to connect to a controller in the site, the connect service informs the secondary user that there is a primary user connected and that the secondary user can login as a read-only user.

10. The system of claim 1, wherein:
    an auto log-off can be enabled relative to a primary user;
    a notification time period can be set as a predetermined amount of inactivity time that expires from a last time the primary user accessed the controller;
    when the notification time period expires before the primary user again accesses the controller or another controller within the same site, a force disconnect time period can be set as a predetermined amount of inactivity time that occurs until the primary user is forcibly disconnected from the controller;
    the primary user is informed when the notification time period expires that the connection by the primary user to the controller is about to be disconnected; and
    the primary user can reset the force disconnect time period to allow continued access by the primary user to the controller.

11. A supervisor user management system comprising:
    a supervisor;
    one or more site controllers of a site subject to management by and/or communication with the supervisor;
    one or more field controllers subject to management by and/or communication with a site controller of the one or more site controllers; and
    building equipment subject to observation and/or control by a field controller of the one or more field controllers; and
    wherein:
    one or more users navigate the supervisor to connect to a site controller of the one or more site controllers to observe and/or control of the building equipment;

a first user of the one or more users connected to a site controller of the one or more site controllers has write permission relative to the site controller;
a second user of the one or more users that is connected to the site controller of the one or more site controllers has read only permission relative to the site controller in response to the second user connecting to the site controller after the first user connects to the site controller;
at least one controller comprises a processor;
a user with write permission is a primary user;
a user with read only permission is a secondary user;
the primary user has write permission for each of the site controllers of the one or more site controllers of the site; and
the secondary user has read only permission for each of the site controllers of the one or more site controllers of the site.

12. The system of claim 11, further comprising:
an auto log-off module connected to the supervisor; and
wherein:
the auto log-off module monitors activity of a primary user while connected to a site controller;
if no activity of the primary user relative to the site controller is detected for a first predetermined period of time, the primary user is notified about the inactivity;
if no activity of the primary user relative to the site controller is detected for a second predetermined period of time after the first predetermined period of time, then the primary user is disconnected from the site controller.

13. The system of claim 12, wherein the primary user can reset the second predetermined period of time in order to remain connected to the site controller.

14. The system of claim 11, further comprising:
a user logic synchronization module; and
wherein the user synchronization module tracks login attempts, shares active user information among other controllers of the site, notes a secondary user connection, establishes a block on the connection, and/or rejects a login attempt by the secondary user as a write user in view of a primary user presently being logged in.

15. A method for managing user access to controllers for building control, comprising:
making a connection for a user to a site controller of one or more controllers of a site;
classifying the user as a primary or secondary user according to a read only or write connection to the site controller, respectively; and
limiting to one a number of primary users connected to the one or more controllers of the site, wherein the primary user is the user with the earliest connection to the site controller; and
wherein:
the primary user can view site controller information about building control and make changes to the information;
the primary user has write permission; and
the secondary user has read only permission.

16. The method of claim 15, wherein the site controller information about building control pertains to alarms, statuses, setpoints and/or event alerts and/or monitoring and actuation mechanisms of building control equipment.

17. The method of claim 15, further comprising:
making a connection for one or more secondary users to the controller of the one or more controllers of the site; and
wherein a secondary user can view the site controller information but not make changes to the information.

18. The method of claim 17, further comprising:
measuring a time of a connection without activity of the primary user to the site controller of the one or more site controllers;
providing a notification to the primary user when the time of the connection without activity of the primary user to the site controller of the one or more site controllers reaches a first predetermined amount;
measuring a time after the notification without activity of the primary user to the site controller of the one or more site controllers; and
forcibly disconnecting the primary user when the time after the notification without activity of the primary user to the controller of the one or more site controllers reaches a second predetermined amount; and
wherein the primary user can reset the time for measuring a time of a connection without activity of the primary user to the site controller of the one or more site controllers after the notification to avoid the forcibly disconnecting the primary user from the site controller.

19. The method of claim 15, wherein:
access details of a primary user are synced across site controllers of a site;
upon the access details of the primary user being synced, a heart beat timer is started to send access details at every certain number of units of time to handle fail over scenarios; and
the heart beat timer is cancelled when the primary user is logged out.

* * * * *